United States Patent
Takimoto et al.

(10) Patent No.: US 6,392,383 B1
(45) Date of Patent: *May 21, 2002

(54) FUNCTION EXTENDING APPARATUS, ELECTRONIC APPARATUS AND ELECTRONIC SYSTEM

(75) Inventors: Tsuyoshi Takimoto; Masuo Ohnishi, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,523

(22) Filed: Sep. 8, 1999

(30) Foreign Application Priority Data

Sep. 14, 1998 (JP) .......................... 10-260599

(51) Int. Cl.[7] ................................................ H02J 7/00
(52) U.S. Cl. ......................................... 320/115; 700/16
(58) Field of Search .............................. 320/124, 112, 320/113; 700/16

(56) References Cited

U.S. PATENT DOCUMENTS

| | | | |
|---|---|---|---|
| 5,182,699 A | 1/1993 | Kobayashi et al. | 361/683 |
| 5,272,598 A | 12/1993 | Kobayashi et al. | 361/686 |
| 5,377,357 A * | 12/1994 | Nishigaki et al. | 364/237.2 |
| 5,410,712 A * | 4/1995 | Okuno | 395/750 |
| 5,602,456 A * | 6/1995 | Cargin, Jr. et al. | 320/112 |
| 5,475,271 A | 12/1995 | Shibasaki et al. | 307/31 |
| 5,477,123 A | 12/1995 | Allen et al. | 320/124 |
| 6,088,620 A * | 9/1996 | Ninomiya et al. | 700/16 |
| 5,579,487 A * | 11/1996 | Meyerson et al. | 710/100 |
| 5,621,301 A | 4/1997 | Allen et al. | 320/124 |
| 5,627,450 A | 5/1997 | Ryan et al. | 361/686 |
| 5,664,118 A * | 9/1997 | Nishigaki et al. | 710/103 |
| 5,684,384 A * | 11/1997 | Barkat et al. | 320/124 |
| 5,784,641 A * | 8/1998 | Sueyoshi etal. | 395/622 |
| 6,046,571 A * | 8/1998 | Bovio et al. | 320/113 |
| 5,862,393 A * | 1/1999 | Davis | 395/282 |
| 5,875,307 A * | 2/1999 | Ma et al. | 395/283 |
| 5,938,770 A * | 8/1999 | Kim | 713/300 |
| 5,982,141 A | 11/1999 | Hinohara | 320/113 |

FOREIGN PATENT DOCUMENTS

| | | |
|---|---|---|
| JP | 4-55921 | 2/1992 |
| JP | 4-155417 | 5/1992 |
| JP | 5-66858 | 3/1993 |
| JP | 5-66864 | 3/1993 |
| JP | 5-66867 | 3/1993 |
| JP | 10084639 | 3/1998 |
| JP | 10-91303 | 4/1998 |
| JP | 10-124182 | 5/1998 |
| JP | 10-124194 | 5/1998 |

OTHER PUBLICATIONS

Communication, European Search Report dated Nov. 10, 2000 from the European Patent Office.

IBM Technical Disclosure Bulletin, vol. 37, No. 09, Sep. 1994, pp. 375–376.

Communication, European Search Report dated Jan. 4, 2001 fromthe European Patent Office.

* cited by examiner

*Primary Examiner*—Edward H. Tso
*Assistant Examiner*—Pia Tibbits
(74) *Attorney, Agent, or Firm*—Staas & Halsey LLP

(57) ABSTRACT

The present invention discloses a function extending apparatus detachably connected to an electronic apparatus to enhance functions of the electronic apparatus, the function extending apparatus including a connection control part controlling a connection between a battery and a charging part in accordance with a result of detection of docking to the electronic apparatus so as to supply power from the electronic apparatus to the battery.

11 Claims, 14 Drawing Sheets

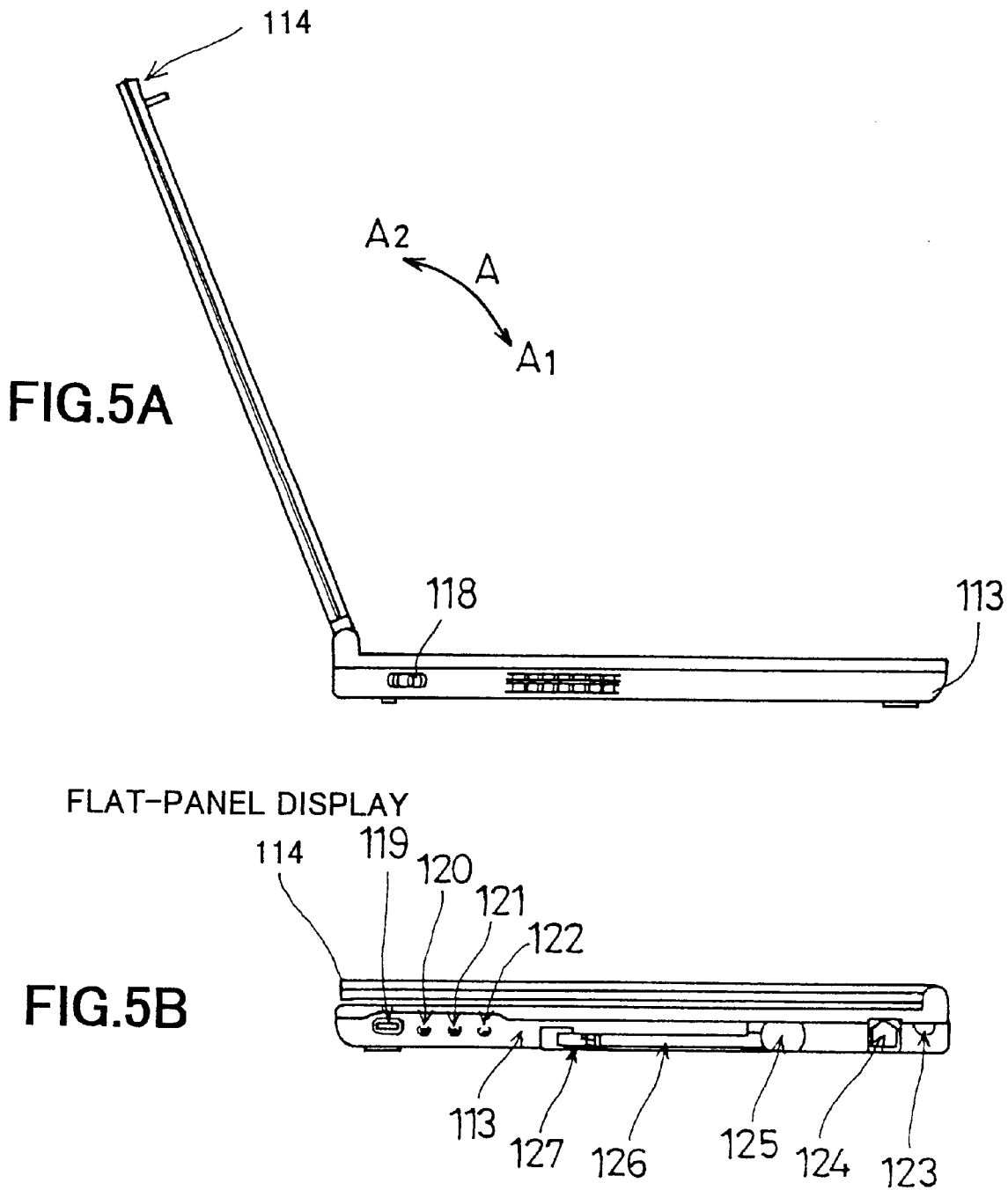

FUNCTION EXTENDING APPARATUS, ELECTRONIC APPARATUS AND ELECTRONIC SYSTEM

BACKGROUND OF THE INVENTION

1. Field of the Invention

The present invention generally relates to function extending apparatuses, electronic apparatuses and electronic systems, and more particularly to a function extending apparatus, an electronic apparatus and an electronic system in which functions of the electronic apparatus are enhanced by attaching the function extending apparatus thereto.

Recently, as computers are being developed quickly and becoming widespread, it is more preferable to produce minimized and lightweight portable computers and to realize an increased variety of functions. In other words, in general, in a case of using a part of a computer system as a portable machine, just the most essential functions and minimized lightweight portability are required. On the other hand, in a case of using the same computer as a desktop, it is required that the computer system can realize a maximum variety of functions by a function extending apparatus.

To realize the above-mentioned computer system, a portable personal computer (PC) which has just the most essential needed functions, such as a notebook computer, and a function extending apparatus extending the PC's functions by attaching to the portable PC are provided.

The extended station requires a large power consumption when the extended station is attached to the portable PC in order to extend functions. In this case, internal batteries mounted in the portable PC are not enough to operate the extended station and enhance functions. Thus, when the extended station is needed, external power is required.

2. Description of the Related Art

FIG.1 shows a diagram illustrating an example of a construction of a conventional electronic system.

Conventionally, an electronic system 1 such as an information processor system includes a notebook PC 10 having essential functions and an extended station 20 that is used with the notebook PC 10 to enhance its functions.

The extended station 20 is mounted to a bottom surface of the notebook PC 10 by connecting a connector 21 with a connector 11 of the notebook PC 10. The extended station 20 includes a floppy disk drive 22 to record or read data stored in a floppy disk 30 and a CD-ROM drive 23 to read data from a CD-ROM 40. The notebook PC 10 does not include any of a floppy disk drive, a CD-ROM drive and a stereo speaker 24, which require much power consumption. The notebook PC 10 however extends its functions to operate the floppy disk drive 22, the CD-ROM drive 23 and a stereo speaker 24 by attaching to the extended station 20.

In this case, power for both of the notebook PC 10 and the extended station 20 is supplied by using an AC adapter 50 or an internal battery pack 12 mounted in the notebook PC 10.

In the conventional electronic system 1, when the extended station 20 is connected to the notebook PC 10, power is supplied and then the functions of the notebook PC 10 are enhanced. In this case, when the notebook PC 10 supplies power only by the internal battery pack 12, the extended station 20 consumes power quickly. Thus, a total operating time is shortened. The internal battery pack 12 can not practically supply power for a whole computer system. Thus, it is required to use the AC adapter 50 as a main power supplier, which limits usage of the electronic system.

In addition, the extended station 20 itself without the notebook PC 10 does not have any effective function.

SUMMARY OF THE INVENTION

It is a general object of the present invention to provide a function extending apparatus, an electronic apparatus and an electronic system in which the above-mentioned problems are eliminated.

A more specific object of the present invention is to provide a function extending apparatus, an electronic apparatus and an electronic system in which functions of the electronic apparatus can be enhanced, power can be supplied to the electronic apparatus, and batteries mounted in the function extending apparatus and the electronic apparatus can be charged by the supplied power.

The above objects of the present invention are achieved by a function extending apparatus detachably connected to an electronic apparatus to enhance functions of the electronic apparatus, the function extending apparatus including: an area for accommodating a battery supplying power to the electronic apparatus; a charging part receiving external sources, one of which comes from the electronic apparatus, and charging the battery; a docking detecting part detecting a connection to the electronic apparatus; and a connection control part controlling a connection between the battery and the charging part in accordance with a result of detection by the docking detection part so as to supply power from the electronic apparatus to the battery.

According to the present invention, it is possible to charge the battery by connecting the charging part with the battery when the function extending apparatus is not attached to the electronic apparatus. Moreover, it is possible to supply power from the battery to the electronic apparatus when the function extending apparatus is attached to the electronic apparatus.

Further, the above objects of the present invention are achieved by an electronic apparatus detachably connected to a function extending apparatus that is used to enhance functions of the electronic apparatus, the electronic apparatus including: an area for accommodating a first battery; and a charging part receiving power from the function extending apparatus, and charging the first battery.

According to the present invention, it is possible to charge the first battery mounted in the electronic apparatus by supplying power form the function extending apparatus when the electronic apparatus is attached to the function extending apparatus.

Furthermore, the above objects of the present invention are achieved by an electronic system in which functions of an electronic apparatus are enhanced by attaching the electronic apparatus to a function extending apparatus providing more functions, the electronic system including: a first battery supplying power to the electronic apparatus, the first battery detachably connected to the electronic apparatus; and a second battery supplying power to the function extending apparatus, the second battery detachable connect to the function extending apparatus, wherein the first battery and the second battery are interchangeable.

According to the present invention, it is possible to substitute the second battery for the first battery and the reverse is also true.

BRIEF DESCRIPTION OF THE DRAWINGS

Other objects, features and advantages of the present invention will become more apparent from the following detailed description when read in conjunction with the accompanying drawings, in which:

FIG. 5A shows a left side view of the notebook PC of the electronic system according to the embodiment of the present invention and FIG. 5B shows a right side view of the notebook PC of the electronic system according to the embodiment of the present invention;

DESCRIPTION OF THE PREFERRED EMBODIMENTS

Figure 1:
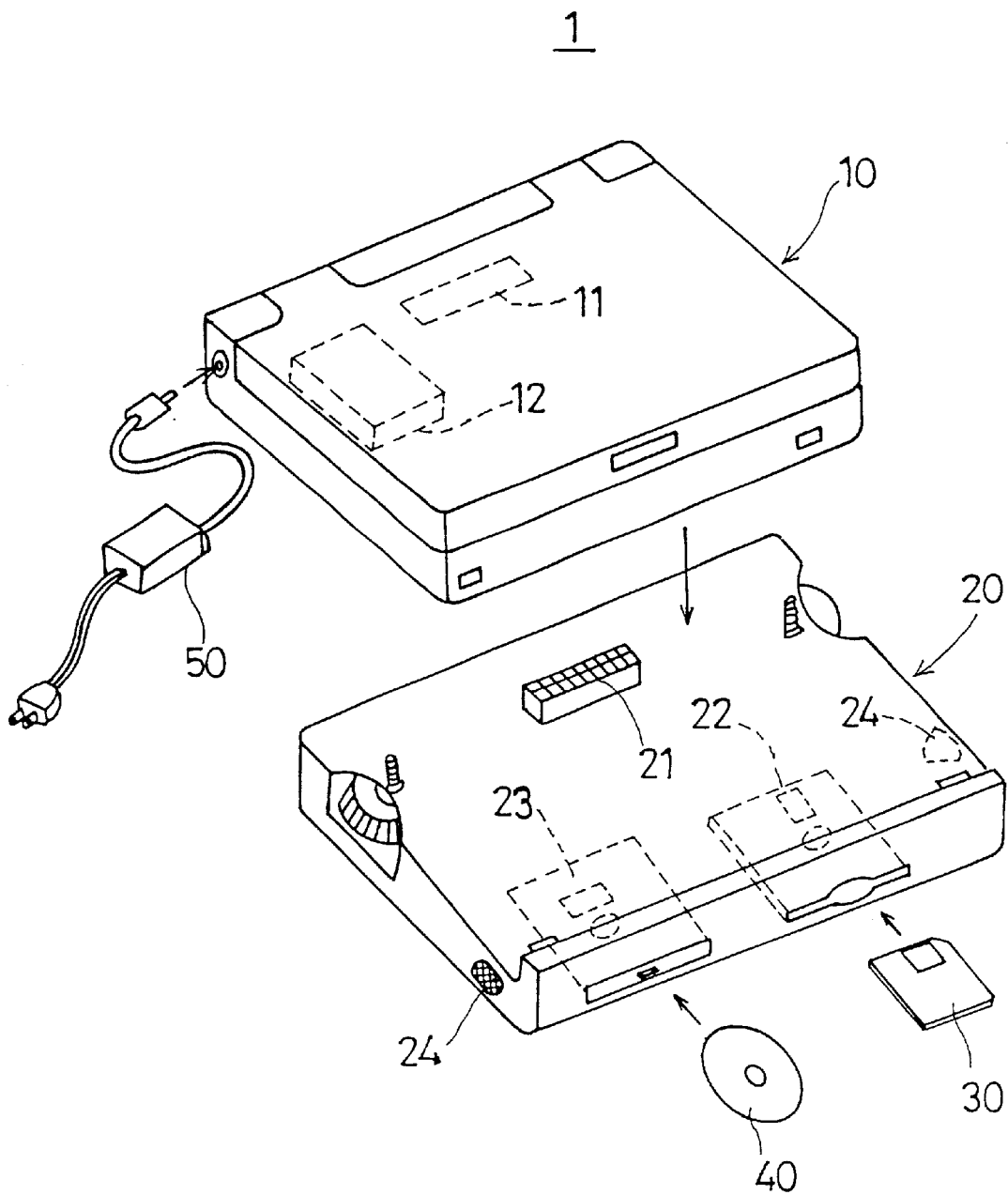
FIG. 1 shows a diagram illustrating an example of a construction of a conventional electronic system.
Figure 2:
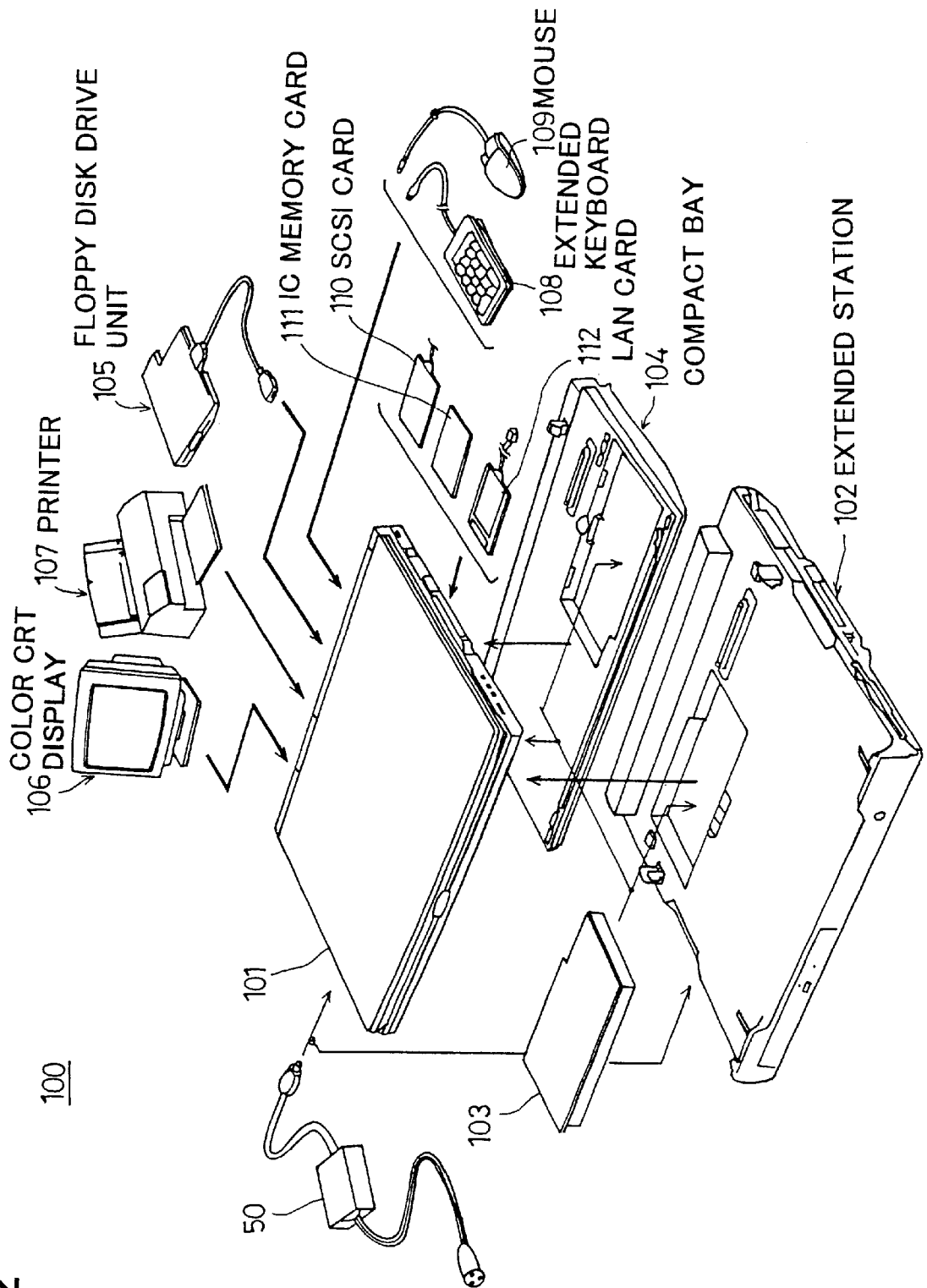
FIG. 2 shows a diagram illustrating an electronic system according to the embodiment of the present invention.

FIG. 2 shows a diagram illustrating an electronic system according to an embodiment of the present invention.

The electronic system 100 according to the embodiment of the present invention includes a notebook PC 101 corresponding to the electronic apparatus in the claims, an extended station 102 corresponding to the function extending apparatus in the claims, a battery pack 103 corresponding to the first battery or the second battery in the claims, a compact bay 104, and an external floppy disk drive unit 105. Moreover, the electronic system 100 is connectable to a color CRT display 106, a printer 107, an extended keyboard 108 and a mouse 109. Also, the electronic system 100 is connectable to a PC card that is in conformity to the PCMCIA standard such as an SCSI card 110, an IC memory card 111, a LAN card 112 or the like.

The notebook PC 101 will now be explained with reference to FIGS. 3, 4, 5A, 5B, 6A and 6B.

Figure 3:
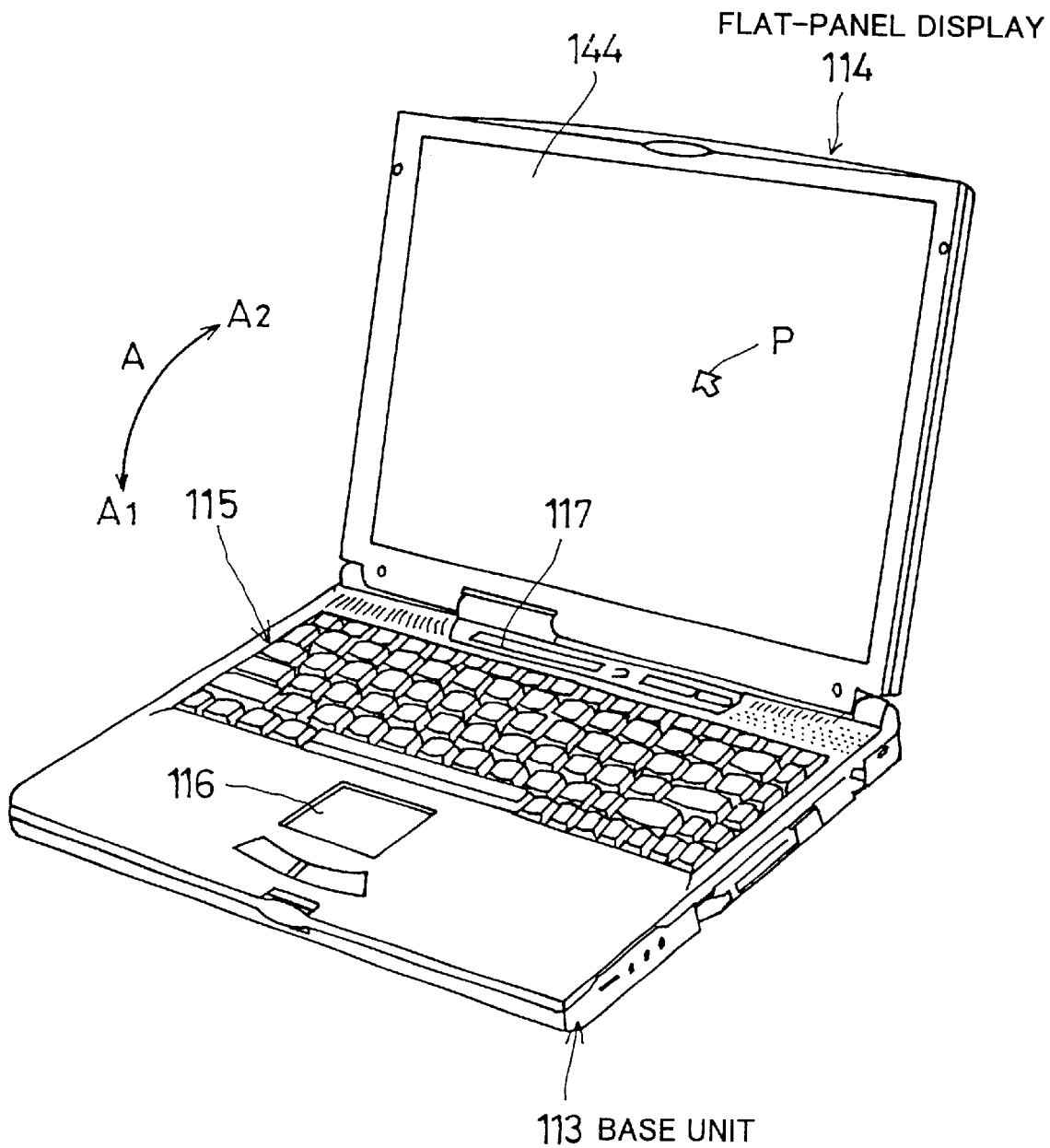
FIG. 3 shows a perspective diagram illustrating the notebook PC of the electronic system according to the embodiment of the present invention.

FIG. 3 shows a perspective diagram illustrating the notebook PC of the electronic system according to the embodiment of the present invention.

Figure 4:
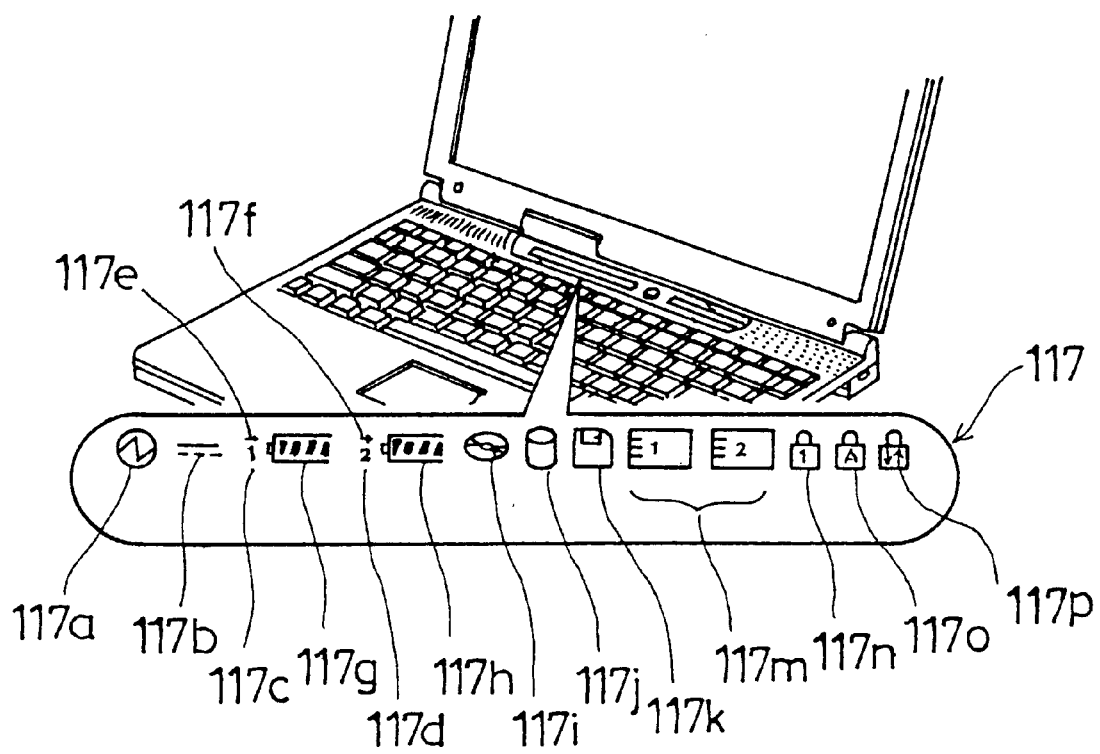
FIG. 4 shows a diagram illustrating an example of an operation state display part of the electronic system according to the embodiment of the present invention.

FIG. 4 shows a diagram illustrating an example of an operation state display part of the electronic system according to the embodiment of the present invention.

FIG. 5A shows a left side view of the notebook PC of the electronic system according to the embodiment of the present invention. FIG. 5B shows a right side view of the notebook PC of the electronic system according to the embodiment of the present invention.

Figure 6A:
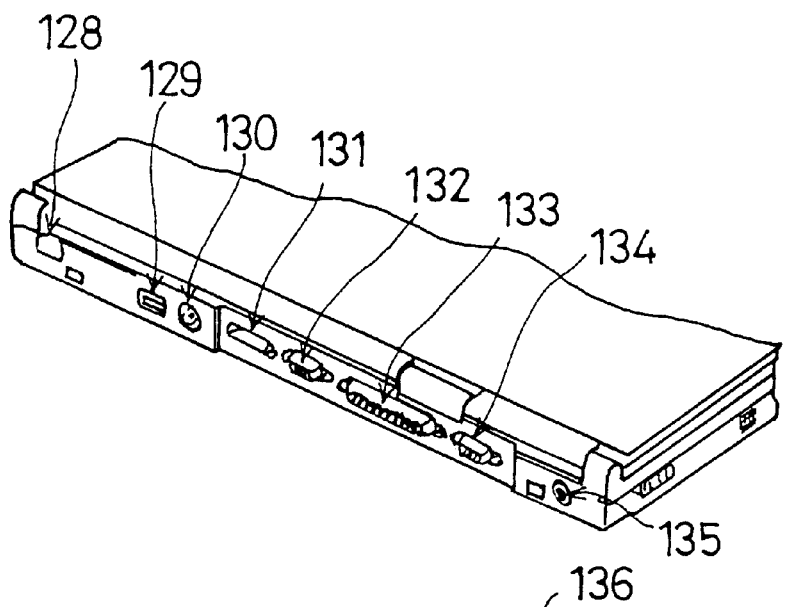
FIG. 6A shows a rear elevation of the notebook PC of the electronic system according to the embodiment of the present invention and FIG. 6B shows a bottom view of the notebook PC of the electronic system according to the embodiment of the present invention.
Figure 6B:
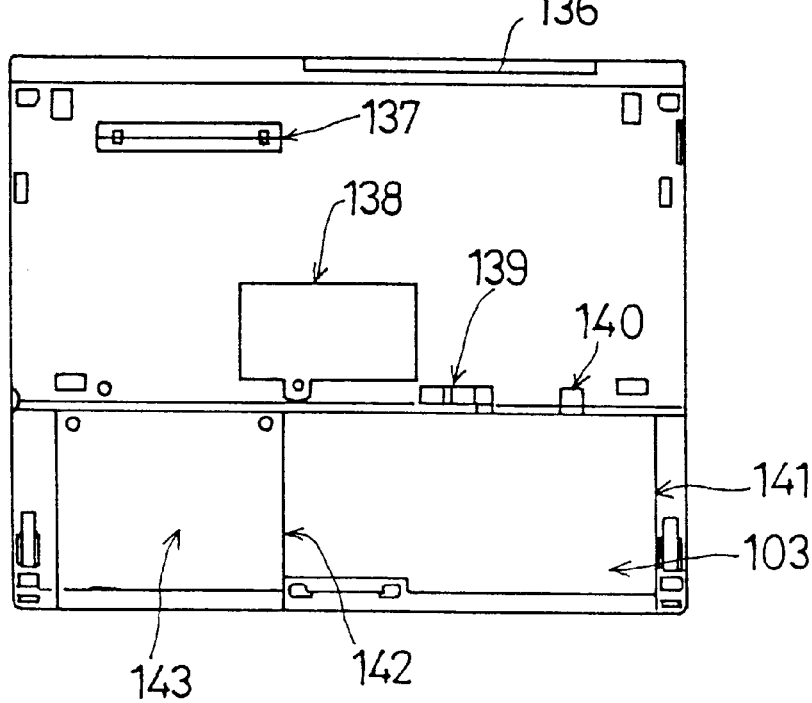

FIG. 6A shows a rear elevation of the notebook PC of the electronic system according to the embodiment of the present invention. FIG. 6B shows a bottom view of the notebook PC of the electronic system according to the embodiment of the present invention.

In FIG. 5A, the notebook PC 101 includes a base unit 113 and a flat-panel display 114 that is pivotable in an A1 direction or an A2 direction. The flat-panel display 114 is pivoted in the A1 direction to a closed position when the notebook PC 101 is carried. As shown in FIG. 5B, the flat-panel display 114 attaches to the base unit 113 so that the notebook PC 101 becomes handy to carry.

When the notebook PC 101 is used, the flat-panel display 114 is pivoted in the A2 direction to an opened position so that the base unit 113 and the flat-panel display 114 become available for use as shown in FIG. 5A.

In a state of being available for use as shown in FIG. 5A, a keyboard 115 and a pointing device 116 are positioned on the top surface of the base unit 113, as shown in FIG. 3, so that a pointer P on the flat-panel display 114 can be operated by the pointer device 116 and a command or data can be input from the keyboard 115. In addition, an operation state display 117 is positioned at an upper-most position on the surface of the base unit 113.

The operation state display 117 shows an operation state of the notebook PC 101.

The operation state display 117 is composed of an LCD (Liquid Crystal Display). As shown in FIG. 4, the operation state display 117 includes a SUS/RES display 117a, an AV adapter 117b, battery pack mounting state displays 117c and 117d, battery charging state displays 117e and 117f, battery capacity displays 117g and 117h, a CD-ROM drive access display 117i, a hard disk access display 117j, a floppy disk access display 117k, a PC card access display 117m, a number lock display 117n, a caps lock display 117o, and a scroll lock display 117p.

The SUS/RES display 117a is turned on when the notebook PC 101 operates, blinked when the notebook PC 101 is suspended, and turned off when the notebook PC 101 is turned off.

The AC adapter display 117b is turned on when power is supplied from the AC adapter.

The battery pack mounting state display 117c is turned on when the internal battery pack 103 is mounted in the base unit 113. Also, the battery pack mounting state display 117d is turned on when the internal battery pack 103 is mounted in the extended station 102 or the compact bay 104.

The battery charging state display 117e is turned on when the battery pack 103 mounted in the base unit 113 is being charged. Also, the battery charging state display 117f is turned on when the battery pack 103 mounted in the extended station 102 or the compact bay 104 is being charged.

The battery capacity display 117g indicates available capacity of the battery pack 103 mounted in the base unit 113. The battery capacity display 117h indicates available capacity of the battery pack 103 mounted in the extended station 102 or the compact bay 104.

The CD-ROM drive access display 117i is turned on when a CD-ROM drive 149 mounted in the extended station 102 or the compact bay 104 is accessed.

The hard disk access display 117j is turned on when an internal hard disk built in the base unit 113 or the hard disk mounted in the compact bay 104 is accessed.

The floppy disk access display 117k is turned on when the external floppy disk drive unit 105, an internal floppy disk drive mounted in the extended station 102 or a hard disk mounted in the compact bay 104 is accessed.

The PC card access display 117m is turned on when a PC card, which is inserted in a PC card slot 126 provided in the base unit 113, is accessed.

The number lock display 117n is turned on when the keyboard is set in a ten-key mode. The caps lock display 117o is turned on when all letters are set to be capital. The scroll lock display 117p is turned on when a scroll lock key is operated.

A power switch 118 is provided at the left side of the base unit 113 as shown in FIG. 5A. The operation of the notebook PC 101 is turned on when the power switch is turned "ON".

In addition, a sound volume control 119, a headphone jack 120, a microphone jack 121, a line-in jack 122, a burglarproof lock 123, a modular connector 124, a PC card lock 125, the PC card slot 126, and a PC card lock 127 are provided on the right side of the base unit 113 as shown in FIG. 5B.

Sound volume is adjusted by operating the sound volume control 119.

A headphone is connected to the headphone jack 120.

A microphone is connected to the microphone jack 121.

A sound input connector is connected to the line-in jack 122 so as to input sound signals from an external device.

A burglarproof cable is connected to the burglarproof lock 123.

A telephone line connector jack is connected to the modular connector 124.

A PC card such as the SCSI card 110, the IC memory card 111 or the LAN card 112 is connected to the PC card slot 126.

A PC card inserted in the PC card slot 126 is locked by the PC card lock 127.

On the rear side of the base unit 113 as shown in FIG. 6A, an infrared communication port 128, a USB connector 129, a connector 130 for the extended keyboard or the mouse, a floppy disk unit connector 131, a serial connector 132, a parallel interface connector 133, a CRT interface connector 134 and a DC-IN connector 135 are provided.

The infrared communication port 128 is an interface between infrared communication and the notebook PC 101.

A peripheral device, which is in conformity to the USB (Universal Serial Bus) standard, is connected to the USB connector 129.

The extended keyboard 108 or the mouse 109 is connected to the connector 130.

The floppy disk drive unit 105 is connected to the floppy disk unit connector 131.

A device, which connector is in conformity to the RS232C standard, is connected to the serial connector 132.

The printer 107 is connected to the parallel interface connector 133.

The color CRT display 106 is connected to the CRT connector 134.

The AC adapter 50 is connected to the DC-In connector 135.

Moreover, on the bottom surface of the notebook PC 101 as shown in FIG. 6B, a connector cover 136, an extended unit connector 137, an extended RAM module slot 138, an internal battery pack lock 139, an unlock button 140, an internal battery pack slot 141 and an internal hard disk slot 142 are provided.

The above-mentioned connectors in FIG. 6A are covered with the connector cover 136.

The extended station 102 or the compact bay 104 is connected to the extended unit connector 137.

An extended RAM module is set in the extended RAM module slot 138.

The internal battery pack lock 139 locks the internal battery pack 103 in the battery pack slot 141 when the internal battery pack 103 is set therein.

When the unlock button 140 is pushed, the internal battery pack lock 139 is unlocked.

The internal battery pack 103 is mounted in the internal battery pack slot 141.

The internal hard disk unit 143 is mounted in the internal hard disk slot 142.

A liquid crystal display 144 is provided on the inside of the flat-panel display 114 so as to face the base unit 113.

In order to process information, the base unit 113 includes a CPU, a RAM, a ROM, interface circuits, and communication circuits.

The extended station 102 will now be explained.

Figure 7:
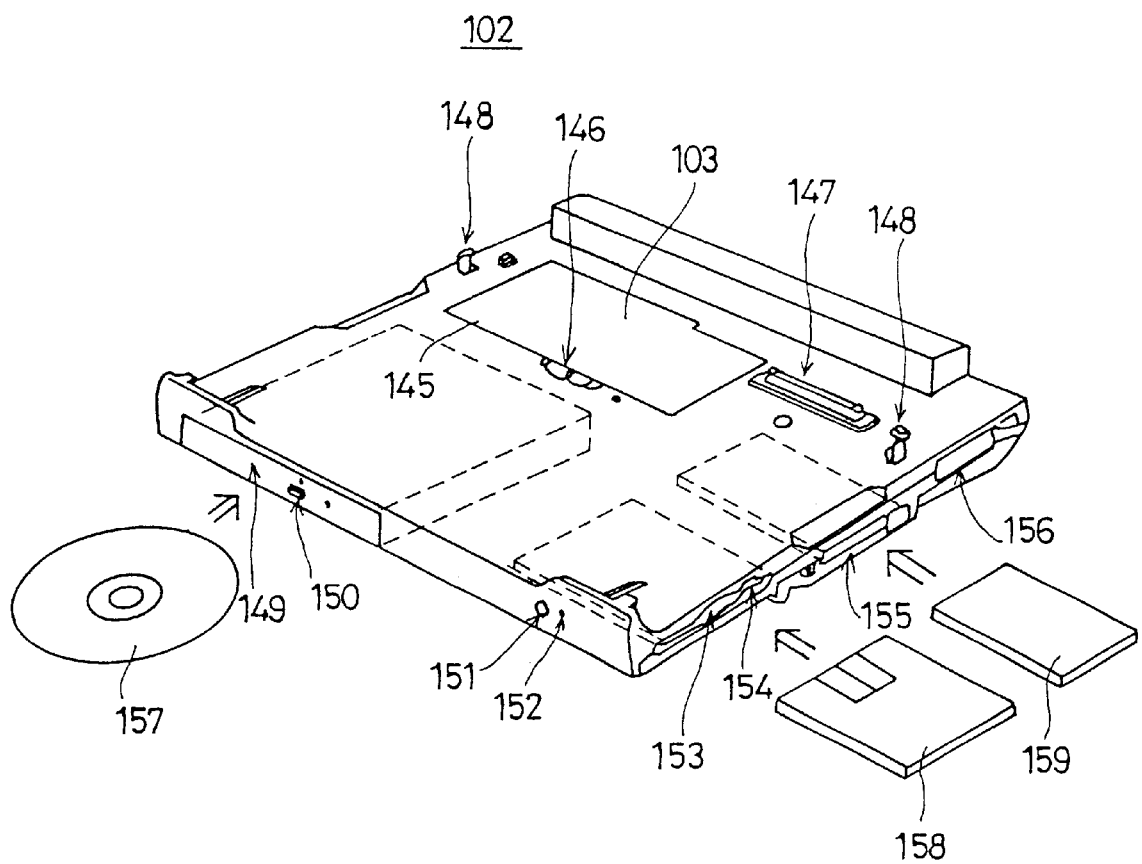
FIG. 7 is a perspective view from a front side of an extended station according to the embodiment of the present invention.
Figure 8:
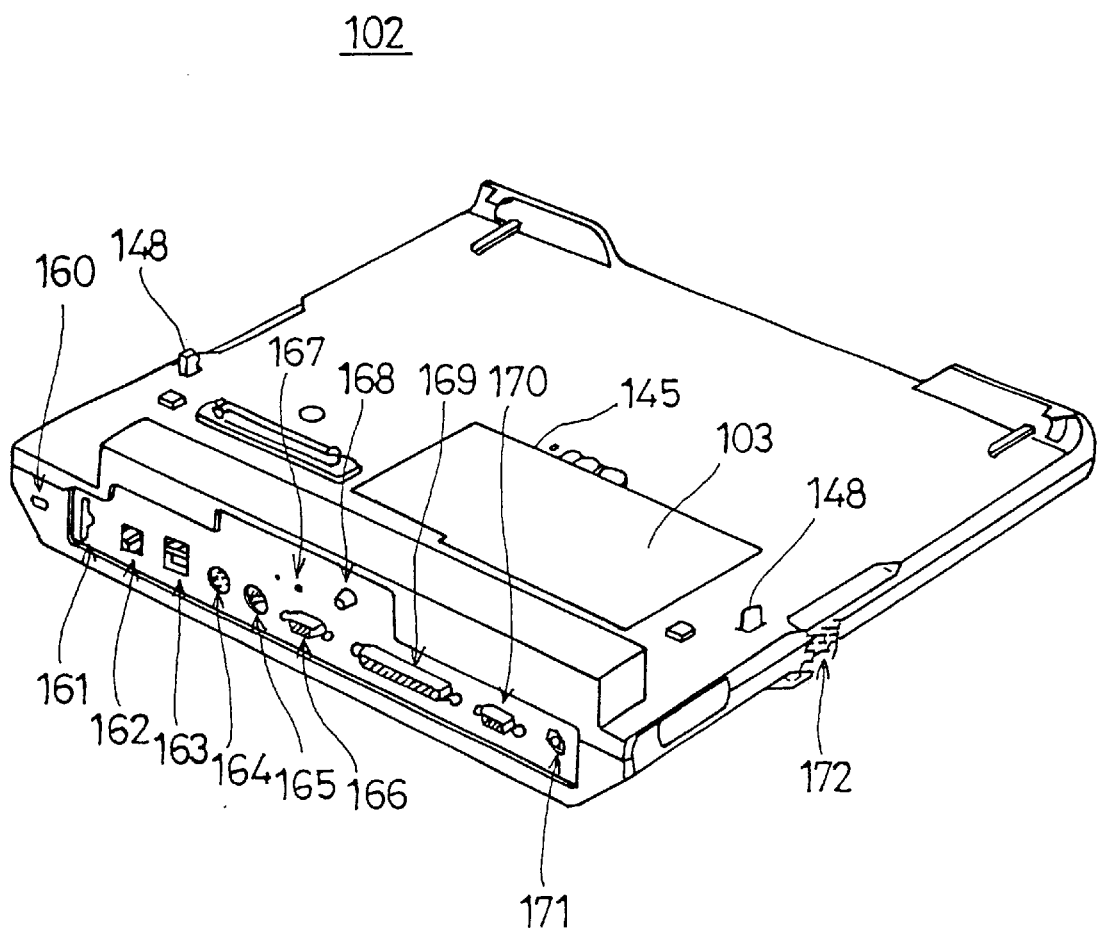
FIG. 8 is a perspective view from a rear side of the extended station according to the present invention.

FIG. 7 is a perspective view from a front side of the extended station according to the embodiment of the present invention. FIG. 8 is a perspective view from a rear side of the extended station according to the present invention.

As shown in FIG. 7, on the top side, the front side and the right side, the extended station 102 includes an internal battery pack slot 145, an internal battery pack lock 146, a connector 147, a connector lock 148, a CD-ROM drive 149, an eject button 150, a detach button 151, a detach permission lamp 152, a floppy disk drive 153, a floppy disk eject button 154, a PC card slot 155 and a detach lever 156.

The battery pack 103 is mounted into the internal battery pack slot 145. The internal battery pack lock 146 locks the battery pack 103 in the internal battery pack slot 145.

The connector 147 is connected to the extended unit connector 137 provided on the bottom surface of the base unit 113. The connector lock 148 is engaged with an engaging member that is provided on the bottom surface of the base unit 113. Thus, the base unit 113 is mechanically engaged with the extended station 102.

The CD-ROM 157 is set in the CD-ROM drive 149. Then, the CD-ROM drive 149 operates the CD-ROM 157 to read information recorded thereon. The CD-ROM 157 is ejected from the CD-ROM drive 149 by pushing the eject button 150.

By pushing the detach button 151, the extended station 102 is detached from the notebook PC 101. The detach permission lamp 152 is composed of an LED so that the detach permission lamp 152 is 'ON' when the notebook PC 101 is ready to detach the extended station 102. The detach lever 156 is operated to detach the extended station 102 from the notebook PC 101. The notebook PC 101 is mechanically disconnected from the extended station 102 by the detach lever 156.

The floppy disk 158 is set in the floppy disk drive 153. The floppy disk drive 153 operates the floppy disk 158 to write and/or read information recorded thereon. By pushing the floppy disk eject button 154, the floppy disk 158 is ejected from the floppy disk drive 153.

The PC card 159 is set in the PC card slot 155.

As shown in FIG. 8, on the rear side and the left side, the extended station 102 includes a burglarproof lock 160, a security lock 161, a LAN connector 162, an USB connector 163, an extended keyboard connector 164, a mouse connector 165, a serial connector 166, a sound output terminal 167, an image output terminal 168, a parallel connector 169, a CRT connector 170, a DC-IN connector 171, and a ventilating hole 172.

A burglarproof cable is connected to the burglarproof lock 160. The security lock 161 locks the burglarproof lock 160 to the burglarproof cable when the burglarproof cable is fixed to the burglarproof lock 160.

A LAN cable is connected to the LAN connector 162. A peripheral, which interface is in conformity to the USB standard, is connected to the USB connector 163.

The extended keyboard connector 164 is used to connect the extended keyboard 108. The mouse connector 165 is used to connect the mouse 109.

The serial connector 166 is used to connect a device which interface is in conformity to the RS-232C standard.

The sound output terminal 167 is used to connect a sound speaker or the like in order to output stereo sound.

The image output terminal 168 is used to connect a television set or the like in order to display an image.

The parallel connector 169 is used to connect a peripheral, which has a parallel port, such as a printer or the like.

The CRT connector 170 is used to connect the CRT display 106.

The DC-IN connector 171 is used to connect an AC adapter in order to externally supply power.

The ventilating hole 172 ventilates heat generated inside of the extended station 102.

The extended station 102 according to the embodiment supplies power from the AC adapter and also supplies power from the battery pack 103 mounted in the internal battery pack slot 145. In addition, while the extended station 102 is supplying power, the battery pack 103 mounted in the internal battery pack slot 145 can be charged.

The battery pack 103 will now be explained with reference to FIGS. 9A and 9B.

Figure 9A:
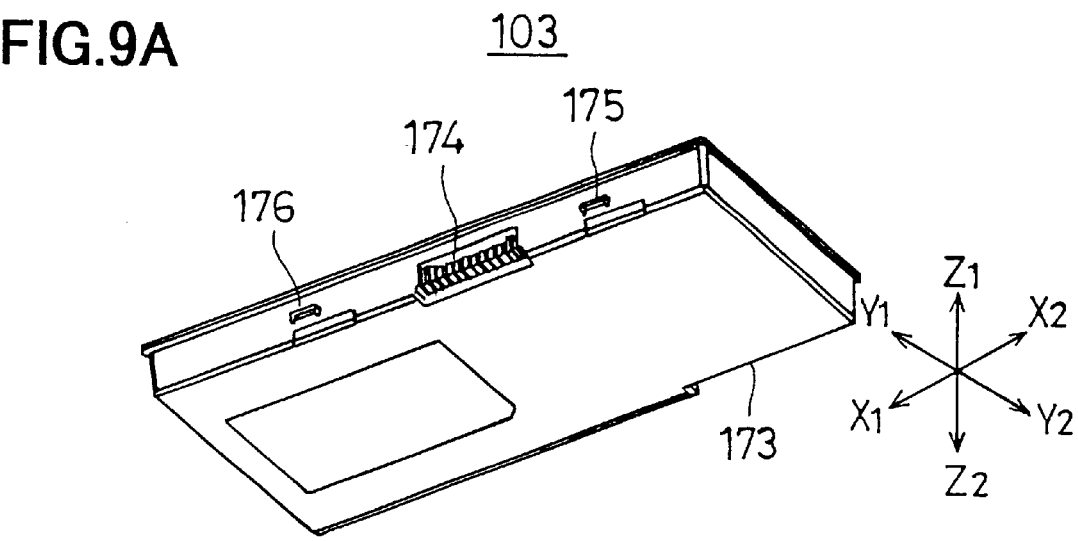
FIG. 9A is a perspective view of a bottom surface of a battery pack in a look-up direction, according to the embodiment of the present invention

FIG. 9A is a perspective view of a bottom surface of the battery pack in a look-up direction, according to the embodiment of the present invention. FIG. 9B is a perspective view of the battery pack that is turned over, according to the embodiment of the present invention.

Figure 9B:
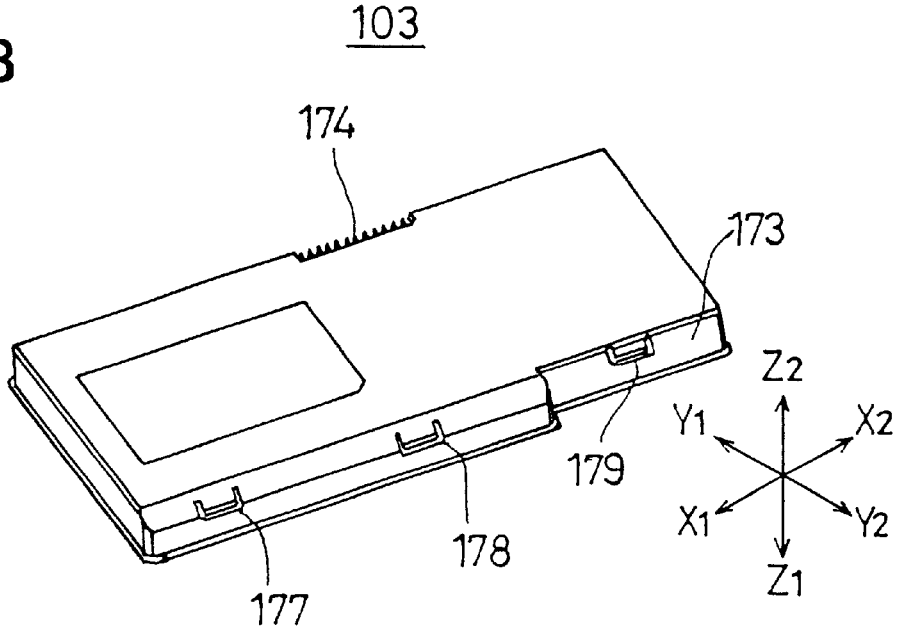
FIG. 9B is a perspective view of the battery pack that is turned over, according to the embodiment of the present invention.

As shown in FIGS. 9A and 9B, the battery pack 103 has a rectangular board shape and a cut-off portion 173. On a side surface indicated by a Y1 direction, a terminal 174 is provided so as to electrically connect with the notebook PC 101, the extended station 102, or the compact bay 104. On the side surface indicated by the Y1 direction and a side surface indicated by a Y2 direction, engaging members 175 and 176 in FIG. 9A and engaging members 177, 178, 179 in FIG. 9B are provided. The engaging members 175, 176, 177, 178 and 179 are brought into engagement with the battery slot 141 or 145 when the battery pack 103 is mounted in the notebook PC 101, the extended station 102 and the compact bay 104 so that the battery pack 103 is electrically connected with the battery slot 141 or 145.

Figure 10:
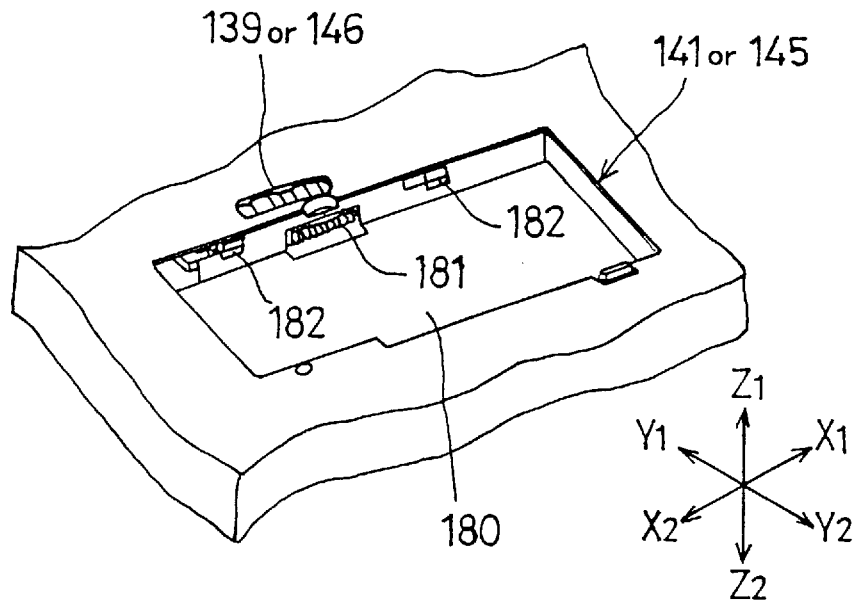
FIG. 10 is a perspective view of the battery pack according to the embodiment of the present invention.

FIG. 10 is a perspective view of the battery pack 103 according to the embodiment of the present invention.

Both of the battery slots 141 and 145 for the notebook PC 101, the extended station 102 and the compact bay 104 fit the shape of the battery pack 103.

As shown in FIG. 10, each of the battery slots 141 and 145 includes a recess portion 180, a contact portion 181, a plurality of engaging members 182, and the internal battery locks 139 and 146.

The recess portion 180 is formed on a top surface or a bottom surface of the notebook PC 101, the extended station 102 and the compact bay 104 and also has the same shape as the battery pack 103.

The contact portion 181 is connected with the terminal 174 of the battery pack 103 when the battery pack 103 is mounted in the recess portion 180.

The plurality of engaging members 182 are provided at two positions on the side surface indicated by the Y1 direction and at three positions on the other side surface indicated by the Y2 direction. Accordingly, the five engaging members 182 are brought into engagement with the engaging members 175, 176, 177, 178 and 179, respectively, when the battery pack 103 is mounted in the recess portion 180. The engaging members 182 lock or unlock the battery pack 103 by operating the internal battery lock 139 and 146 in an X1 direction or in an X2 direction. When the battery pack 103 is unlocked, that is, when the engaging members 182 are brought out of engagement with the engaging members 175, 176, 177, 178 and 179, the battery pack 103 can be removed from the battery pack slot 141 or 145.

Figure 11:
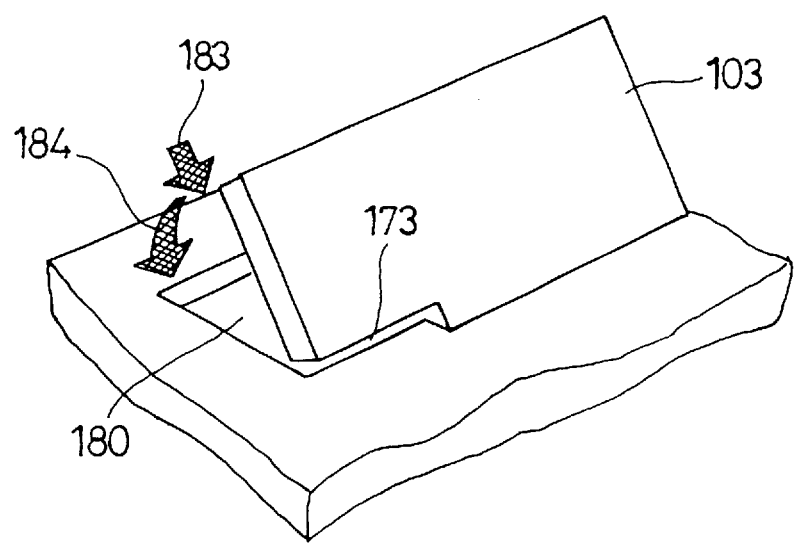
FIG. 11 shows a diagram for explaining how the battery pack is mounted and removed, according to the embodiment of the present invention.

FIG. 11 shows a diagram for explaining how the battery pack 103 is mounted and removed, according to the embodiment of the present invention.

In order to insert the battery pack 103 into the battery pack slot 141 or 145, the battery pack 103 is inserted from a direction indicated by an arrow 183 such that a side surface of the battery pack 103, on which the cut-off portion 173 is provided, fits a corresponding side surface of the recess portion 180.

While the side surface having the cut-off portion 173 of the battery pack 103 fits the corresponding side surface of the recess portion 180, the other side of the battery pack 103 is pushed into the recess portion 180 in a direction indicated by an arrow 184.

An operation of mounting the notebook PC 101 on the extended station 102 will now be explained.

Figure 12:
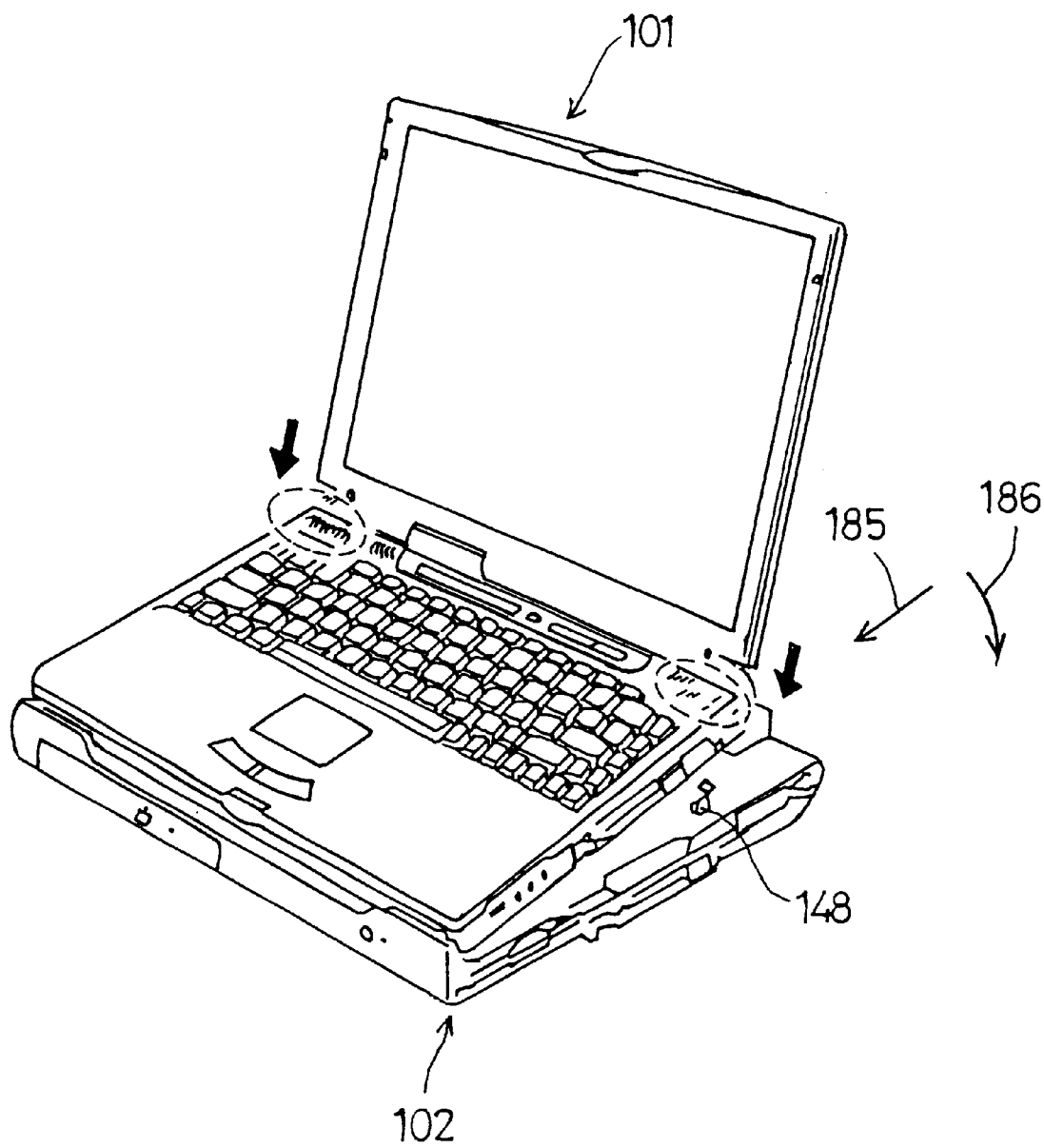
FIG. 12 shows a diagram for explaining the operation of mounting the notebook PC 101 on the extended station 102, according to the embodiment of the present invention.

FIG. 12 shows a diagram for explaining the operation of mounting the notebook PC 101 on the extended station 102, according to the embodiment of the present invention.

When the notebook PC 101 is mounted in the extended station 102, as shown in FIG. 12, the notebook PC 101 is pushed in a direction 185 so as to position a front side of the notebook PC 101 at a topmost position of a front side of the extended station 102 and then a bottom surface of the notebook PC 101 is attached to the extended station 102 in a direction 186. When the notebook PC 101 is attached to the extended station 102, the connector lock 148 of the extended station 102 is brought into engagement with the notebook PC 101 and also the connector 137 of the notebook PC 101 is connected to the connector 147 of the extended station 102.

When attachment of the notebook PC 101 to the extended station 102 is completed, the notebook PC 101 automatically recognizes functions enhanced by the extended station 102, such as the CD-ROM drive 149, the floppy disk drive 153 and the PC card slot 155. Thus, the notebook PC 101 can access the enhanced functions provided by the extended station 102 as if the enhanced functions are provided by the notebook PC 101 itself.

Figure 13:
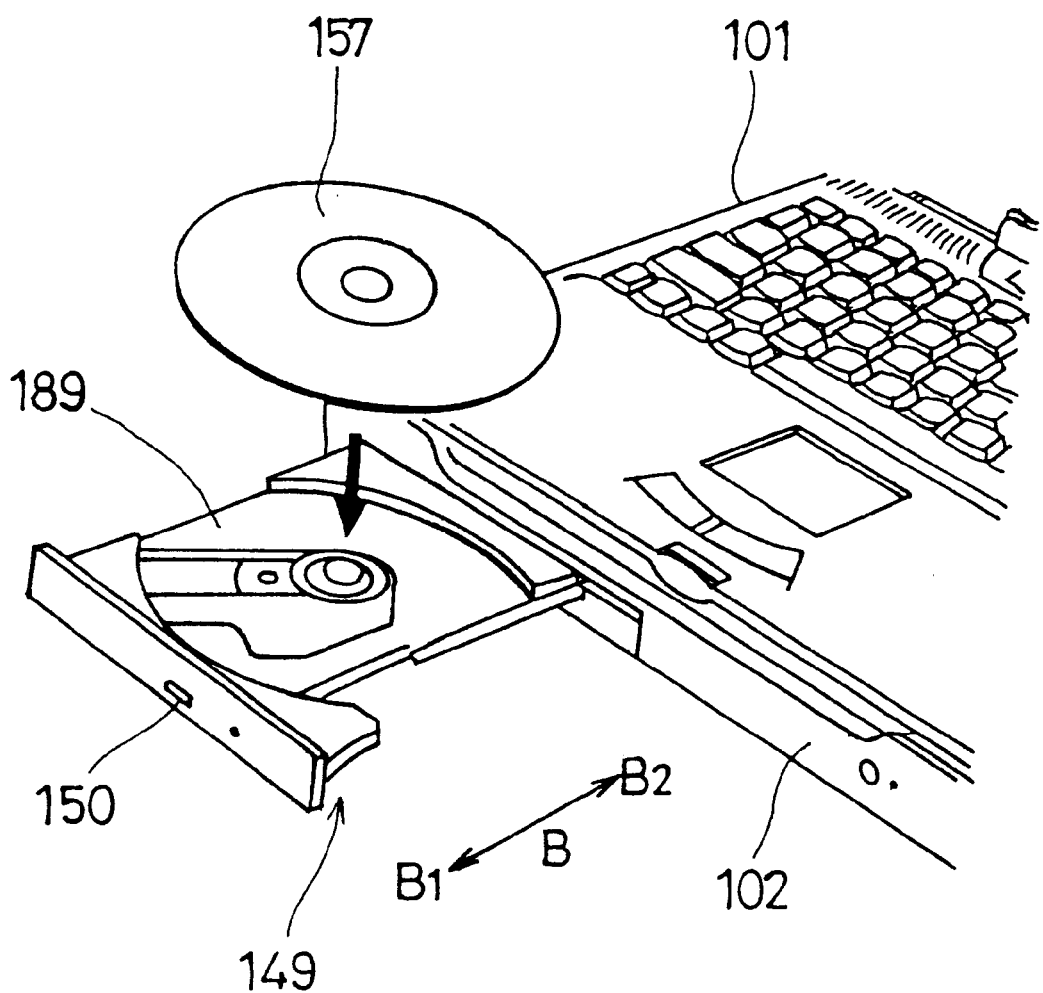
FIG. 13 shows a diagram for explaining an operation when extended functions are used according to the embodiment of the present invention.

FIG. 13 shows a diagram for explaining an operation when the enhanced functions are used according to the embodiment of the present invention.

As shown in FIG. 13, by attaching the notebook PC 101 to the extended station 102, for example, when the eject button 150, which is provided for the CD-ROM drive 149 of the extended station 102, is pushed, a tray 189 is pushed out from the front of the extended station 102 in a direction B1 so that the CD-ROM 157 may be put on the tray 189 and then the CD-ROM 157 is mounted in the CD-ROM drive 149 by pushing the tray 189 into the CD-ROM drive 149 in a direction B2. In a condition in which the CD-ROM 157 is mounted, the notebook PC 101 can read information recorded on the CD-ROM 157 by executing a read instruction to the CD-ROM 157 as if the operation of the CD-ROM drive 149 is a part of functions of the notebook PC 101.

An operation of detaching the notebook PC 101 from the extended station 102 will now be explained.

Figure 14:
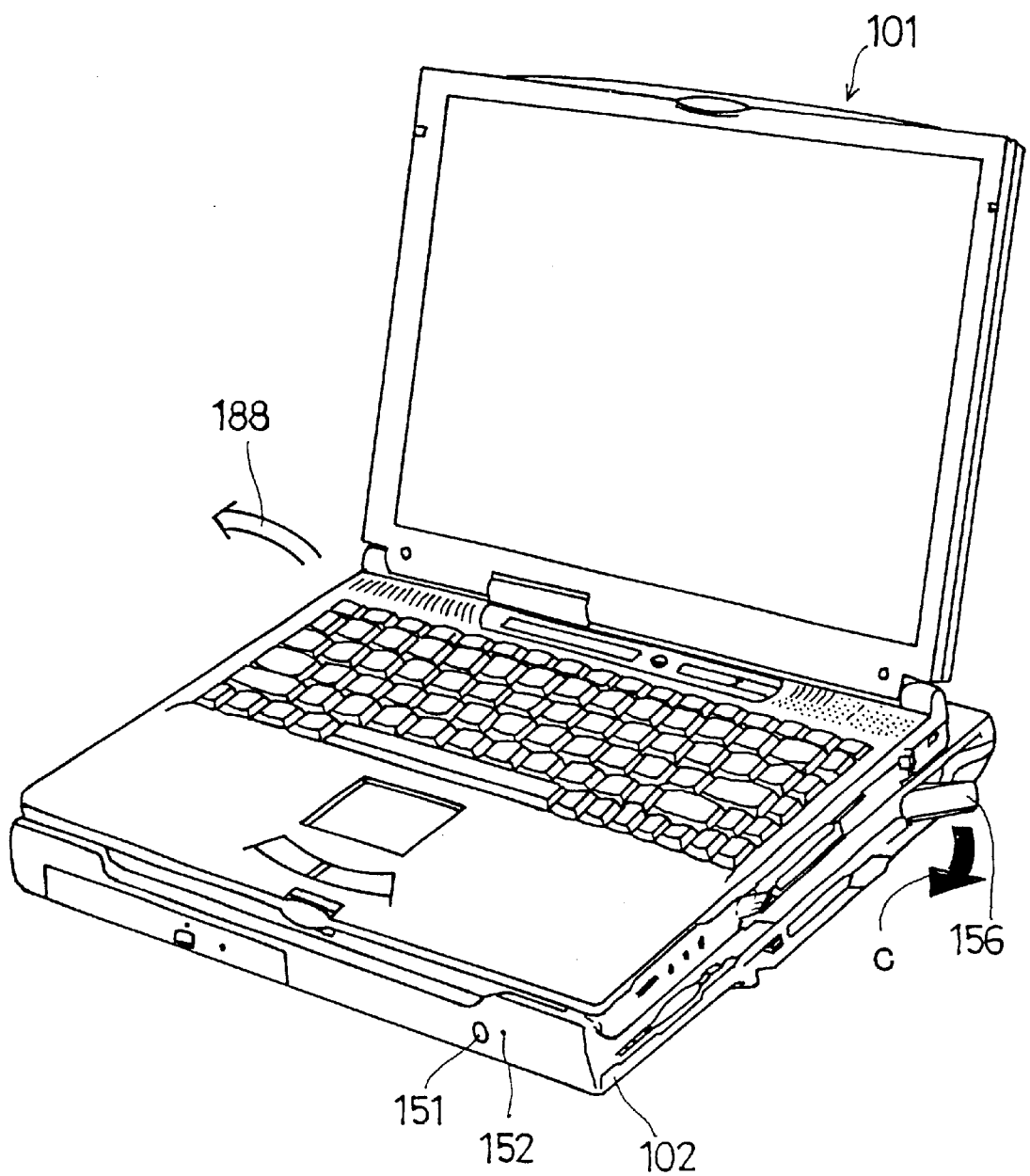
FIG. 14 shows a diagram for explaining the operation of detaching the notebook PC from the extended station, according to the embodiment of the present invention.

FIG. 14 shows a diagram for explaining the operation of detaching the notebook PC from the extended station, according to the embodiment of the present invention.

Referring to FIG. 4, by pushing the detach button 151 provided on the extended station 102, a detaching process is executed by the notebook PC 101. After executing the detaching process, the detach permission lamp 152 is turned on.

The end of the detach lever 156 is fixed to the extended station 102 and another end of the detach lever 156 is free to push and pull. After the detach permission lamp 152 is turned on, when the end of the detach lever 156 is pulled in a direction c, the connector lock 148, which is provided on the extended station 102 as shown in FIG. 12, is brought out of engagement with the notebook PC 101.

After the connector lock 148 is brought out of engagement with the notebook PC 101, when the rear side of the notebook PC 101 is lifted up in a direction 188, the extended unit connector 137 provided on the bottom of the notebook PC 101 in FIG. 6B is released from the connector 147 provided on the extended station 102 in FIG. 7. Consequently, the notebook PC 101 is detached from the extended station 102.

Figure 15:
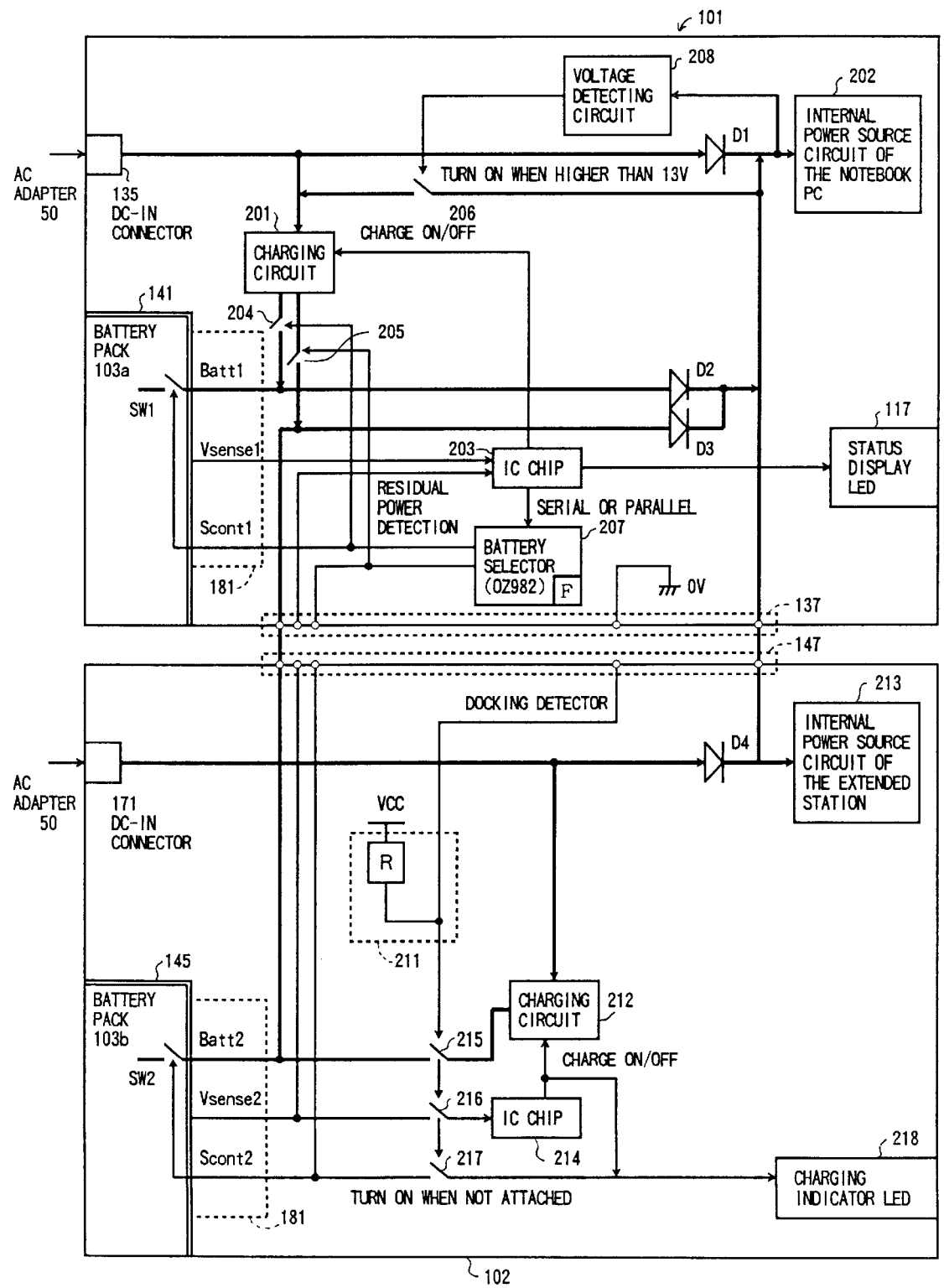
FIG. 15 shows a diagram illustrating a circuit construction of a power supply system according to the embodiment of the present invention.

FIG. 15 shows a diagram illustrating a circuit construction of a power supply system according to the embodiment of the present invention.

The power supply system of the notebook PC 101 is constructed of a charging circuit 201, an internal power source 202, an IC chip 203, switches 204, 205 and 206, a battery selector 207, a voltage detecting circuit 208, and reverse-blocking diodes D1, D2 and D3.

The charging circuit 201 is connected to the DC-IN connector 135 in FIG. 6A. The charging circuit 201 generates a first charging voltage and a second charging voltage from a power source which the AC adapter 50 in FIG. 2 supplies to the DC-IN connector 135 in FIG. 6A. The charging circuit 201 is also connected to the IC chip 203 that controls charging of or discharge a battery pack 103a or 103b sequentially or simultaneously. The IC chip 203 supplies a charge-on signal or a charge-off signal to the charging circuit 201.

When the charge-on signal is supplied to the charging circuit 201 from the IC chip 203, the charging circuit 201 generates and outputs the first charging voltage and the second charging voltage. When the charge-off signal is supplied to the charging circuit 201 from the IC chip 203, the charging circuit 201 stops generating and outputting the first charging voltage and the second charging voltage.

The internal power source circuit 202 connects to the DC-IN connector 135 through the reverse-blocking diode D1. Power is also supplied to the internal power source circuit 202 from the battery pack 103a mounted in the notebook PC 101 through the diode D2, and the battery pack 103b mounted in the extended station 102 through the diode D3, and further supplied from an AC adapter 50 of the extended station 102 through the connector 137 as shown in FIG. 6B. The internal power source circuit 202 is operated in accordance with a direct voltage from the AC adapter 50 or from the battery packs 103a and 103b. Then, the notebook PC 101 is operated.

The IC chip 203 connects to a voltage detecting terminal Vsense1 of the battery pack 103a mounted in the notebook PC 101 and a voltage detecting terminal Vsense2 of the battery pack 103b mounted in the extended station 102. The IC chip 203 supplies a charge-off signal to the charging circuit 201 when voltage of the voltage detecting terminal Vsense1 or Vsense2 is greater than a predetermined voltage. Conversely, when the voltage of the voltage detecting terminal Vsense1 or Vsense2 is less than the predetermined voltage, the IC chip 203 supplies the charge-on signal to the charging circuit 201. Moreover, when the IC chip 203 outputs the charge-on signal, the IC chip 203 also outputs a charge-discharge type signal to the battery packs 103a and 103b in order to control a serial charging/discharging or a parallel charging/discharging. The charge-discharge type signal is defined beforehand. The charge-discharge type signal, which is output from the IC chip 203, is supplied to the battery selector 207.

Supply of battery voltages of the battery packs 103a and 103b is turned on and off by internal switches sw1 and sw2 provided in the battery packs 103a and 103b, respectively. The internal switches sw1 and sw2 are controlled by control terminals Scont1 and Scont2. Switches 204 and 205 control supply of the first charging voltage and the second charging voltage from the charging circuit 201 to the battery packs 103a and 103b. The selector 207 connects to the control terminals Scont1 and Scont2 and also connects to the switches 204 and 205. Accordingly, the battery selector 207 controls the internal switches sw1 and sw2 of the battery packs 103a and 103b, and the switches 204 and 205 in accordance with the charge-discharge type signal supplied by the IC chip 203.

When the charge-discharge type signal supplied by the IC chip 203 indicates 'serial', the battery selector 207 turns on the internal switch sw1 of the battery pack 103a and the switch 204 controlling supply of the first charging voltage. Simultaneously, the battery selector 207 turns off the internal switch sw2 of the battery pack 103b and the switch 205 controlling supply of the second charging voltage. Accordingly, power is supplied to the battery pack 103a until the battery selector 207 receives a next control signal the IC chip 203. When the next control signal is supplied to the IC chip 203, the battery selector 207 turns off the internal switch sw1 of the battery pack 103a and the switch 204. Simultaneously, the battery selector 207 turns on the internal switch sw2 of the battery pack 103b and the switch 205. Accordingly, power is supplied to the battery pack 103b. In this manner, power is sequentially supplied to the battery pack 103a first and the battery pack 103b next.

The battery selector 207 includes a flag F that defines a priority order of batteries to charge or discharge power. For example, when the flag F is 'ON', the battery selector 207 controls switches to supply power to the battery pack 103a first and then the battery pack 103b next. And, in this case, the battery pack 103b is discharged first and then the battery pack 103a is discharged next. Conversely, when the flag F is 'OFF', the battery selector 207 controls switches to supply power to the battery pack 103b first and then the battery pack 103a next. And, in this case, the battery pack 103a is discharged first and then the battery pack 103b is discharged next. In this embodiment, the flag F is set to 'ON' beforehand. Alternately, for example, it may be modified such that the flag F can be selectively set at setup by a user.

When the charge-discharge type signal supplied by the IC chip 203 indicates 'parallel', the battery selector 207 turns on the internal switch sw1 of the battery pack 103a, the internal switch sw2 of the battery pack 103b and the switches 204 and 205 at the same time. Thus, power is supplied to the battery packs 103a and 103b simultaneously. Further, the battery selector 207 turns off the internal switches sw1 and sw2 and the switches 204 and 205 at the same time so that the battery packs 103a and 104b are ready to discharge.

A charge-discharge terminal BATT1 of the battery pack 103a is connected to the internal power source circuit 202 through the diode D2 and supplies the first charging voltage of the charging circuit 201. Also, a charge-discharge terminal BATT2 of the battery pack 103b is connected to the internal power source circuit 202 through the diode D3 and supplies the second charging voltage of the charging circuit 201.

In a case in which power is supplied only from the DC-IN connector 171 of the extended station 102, the voltage detecting circuit 208 detects a voltage indicating that power is being supplied to the internal power source circuit 202 from the DC-IN connector 171 of the extended station 102. In accordance with the detected voltage, the voltage detecting circuit 208 controls the switch 206 provided between the internal power source circuit 202 and the charging circuit 201. When voltage supplied to the internal power source circuit 202 is higher than 13V, that is, when voltage supplied to the internal power source circuit 202 is high enough to charge the battery packs 103a and 103b, the voltage detecting circuit 208 turns on the switch 206 so that the battery packs 103a and 103b are charged.

The power supply system of the extended station 102 will now be explained.

The power supply system of the extended station 102 is constructed of a docking detect circuit 211, a charging circuit 212, an internal power source circuit 213, an IC chip 214, switches 215, 216 and 217, and a reverse-blocking diode D4.

Referring to FIG. 15, the docking detecting circuit 211 outputs a high or low level signal in accordance with a state of connection between the connector 137 and the connector 147. When the connector 137 of the notebook PC 101 is connected with the connector 147 of the extended station 102, voltage Vcc dropped by a resistor R is grounded at the notebook PC 101 through the connector 137 and 147. Thus, an OFF-state voltage is applied to the switches 215, 216 and 217 so as to switch them off. Conversely, when the connector 137 of the notebook PC 101 is not connected with the connector 147 of the extended station 102, the voltage Vcc dropped by the resistor R is applied as an ON-state voltage to the switches 215, 216 and 217 so as to switch them on.

The AC adapter 50 is connected to the DC-IN connector 171. The charging circuit 212 is connected to the DC-IN connector 171 so that the charging circuit 212 generates a charging voltage in accordance with a dc voltage supplied from the AC adapter 50.

The charging voltage generated by the charging circuit 212 is supplied to the charging terminal BATT2 of the battery pack 103b through the switch 215. Moreover, the charging circuit 212 is connected to the IC chip 214 and is controlled in accordance with charge-on/charge-off signals supplied by the IC chip 214. The charging circuit 212 outputs the charging voltage when a charging-on signal is supplied to the charging circuit 212 by the IC chip 214 and the charging circuit 212 stops outputting the charging voltage when a charging-off signal is supplied to the charging circuit 212 by the IC chip 214.

Further, the IC chip 214 is connected to the voltage detecting terminal Vsense2 through the switch 216. That is, when the switch 216 turns on, the IC chip 214 recognizes a voltage of the voltage detecting terminal Vsense2 of the battery pack 103b. Then, the IC chip 214 supplies a charging-off signal to the charging circuit 212 when the voltage of the voltage detecting terminal Vsense2 of the battery pack 103b is higher than a predetermined voltage. On the other hand, the IC chip 214 supplies a charging-on signal to the charging circuit 212 when the voltage of the voltage detecting terminal Vsense2 of the battery pack 103b is lower than the predetermined voltage.

The charging-on and the charging-off signals generated by the IC chip 214 are supplied to the internal switch sw2 of the battery pack 103b and a charging indicator LED 218. When the IC chip 214 outputs the charging-on signal, the charging-on signal is supplied to the charging indicator LED 218 and then the charging indicator LED 218 emits light. Thus, a state of charging is indicated.

The switches 215, 216 and 217 are off while the extended station 102 is connected with the notebook PC 101. Accordingly, the IC chip 214 and the charging circuit 212 are not operated. Thus, the battery pack 103b is not charged by the extended station 102 itself. On the other hand, the switches 215, 126 and 217 are on while the extended station 102 is disconnected from the notebook PC 101. Accordingly, the IC chip 214 and the charging circuit 212 are operated. Thus, the battery pack 103b can be charged by the extended station 102 itself.

When the internal power source circuit 213 of the extended station 102 is connected to the DC-IN connector 171 via the reverse-blocking diode D4, the internal power source circuit 202 of the notebook PC 101 can be supplied via the connectors 137 and 147.

That is, by dc power from the AC adapter 50 connecting to the DC-IN connector 171 or from the internal power source circuit 202 of the notebook PC 101, the internal power source circuit 213 can be supplied with enough power to operate the enhanced functions, such as the CD-ROM drive 149, the floppy disk drive 153 or the like.

As mentioned above, in a state in which the notebook PC 101 is attached to the extended station 102, when the AC adapter 50 is connected to the DC-IN connector 135 or 171, the battery pack 103a mounted in the battery pack slot 141 of the notebook PC 101 and the battery pack 103b mounted in the battery pack slot 145 of the extended station 102 can be charged sequentially or simultaneously. On the other hand, in this state, when the AC adapter 50 is not connected to any of the DC-IN connectors 135 and 171, the notebook PC 101 and the extended station 102 receive power from the batteries 103a and 103b so that the operating time can be increased.

Further, in a state in which the notebook PC 102 is detached from the extended station 102, when the AC adapter 50 is connected to the DC-IN connector 171 of the extended station 102, the extended station 102 can charge the battery pack 103b. The battery packs 103a and 103b have the same shape that fits into the battery pack slots of the notebook PC 101, the extended station 102 and the compact bay 104. Hence, for example, the battery pack 103b charged in the extended station 102 can be mounted into the notebook PC 101 or compact bay 104. Therefore, it is possible to utilize the extended station 102 as a charger.

The present invention is not limited to the specifically disclosed embodiments, variations and modifications, and other variations and modifications may be made without departing from the scope of the present invention.

The present application is based on Japanese priority application No. 10-260599 filed on Sep. 14, 1998, the entire contents of which are hereby incorporated by reference.

What is claimed is:

1. A function extending apparatus receiving power from either a battery or an external power source and detachably connected to an electronic apparatus to enhance functions of the electronic apparatus, said function extending apparatus comprising:

an area accommodating the battery to supply power to the electronic apparatus;

a terminal connectable to the external power source;

a docking part detachably connecting said function extending apparatus and the electronic apparatus electrically, said docking part connected to said area and capable of supplying power from at least one of the battery to the electronic apparatus, the terminal to the electronic apparatus, and the electronic apparatus to the battery;

a charging part charging the battery by the external power source;

a docking detecting part detecting a connection to the electronic apparatus; and a connection control part controlling a connection between the battery and said charging part in accordance with a result of detection by the docking detecting part, so that the battery can be charged by one of said charging part while said function extending apparatus is disconnected from the electronic apparatus and said docking part while said function extending apparatus is connected to the electronic apparatus.

2. The function extending apparatus as claimed in claim 1, further comprising:

a charge control part controlling charging of said battery by providing a charging control signal to said charging part in accordance with a voltage of said battery while said function extending apparatus is disconnected to the electronic apparatus.

3. The function extending apparatus as claimed in claim 2, further comprising a display part displaying a state indicating that said battery is being charged by said charging part, in accordance with said charging control signal wherein said charge control part provides said charging control signal to said display part.

4. The function extending apparatus as claimed in claim 1, wherein said function extending apparatus detachably accommodates the battery.

5. An electronic apparatus receiving power from either a first battery or an external power source and detachably connected to a function extending apparatus that is used to enhance functions of said electronic apparatus, said electronic apparatus comprising:

an area accommodating the first battery;

a docking part detachably connecting the function extending apparatus and said electronic apparatus electrically, said docking part capable of supplying power from at least one of the external power source to the function extending apparatus and from the function extending apparatus to said electronic apparatus;

a power detecting part detecting a supply of power from at least one of the external power source and said docking part; and a charging part receiving the power from at least one of the external power source and said docking part in accordance with a result of detecting by the power detecting part, and charging the first battery.

6. The electronic apparatus as claimed in claim 5, wherein said charging part charges a second battery mounted in said function extending apparatus by the power from said docking part while said electronic apparatus is connected to said function extending apparatus.

7. The electronic apparatus as claimed in claim 6, further comprising a charge control part controlling said charging part to charge the first battery and the second battery in accordance with respective voltages of the first battery and the second battery.

8. The electronic apparatus as claimed in claim 6, wherein said second battery and said first battery are interchangeable.

9. The electronic apparatus as claimed in claim 7, wherein said charge control part controls said charging part so as to sequentially charge the first battery and the second battery.

10. The electronic apparatus as claimed in claim 7, wherein said charge control part controls said charging part so as to simultaneously charge the first battery and the second battery.

11. An electronic system receiving power from either a first battery, a second battery or an external power source in which functions of an electronic apparatus are enhanced by attaching the electronic apparatus to a function extending apparatus providing more functions, said electronic system comprising:

a first area, which is provided in the electronic apparatus, and accommodating the first battery supplying power to said electronic apparatus, the first battery detachably connected to said electronic apparatus;

a second area, which is provided in the function extending apparatus, and accommodating the second battery supplying power to said electronic apparatus or said function extending apparatus, the second battery detachably connected to said function extending apparatus;

a charging part, which is provided in said function extending part, charging the second battery from the external power source connected to said charging part while said function extending apparatus is disconnected from said electronic apparatus; and a controlling part, which is provided is said electronic apparatus, controlling to charge the first battery and the second battery while said function extending apparatus is connected to said electronic apparatus, wherein the first battery and the second battery are interchangeable.

* * * * *